Oct. 16, 1962 C. F. JUENG 3,058,412
BUILDING FOR OXYGEN STEEL MAKING
Filed July 15, 1960 2 Sheets-Sheet 1

INVENTOR.
CARL F. JUENG
BY
Harry B. Keck
ATTORNEY

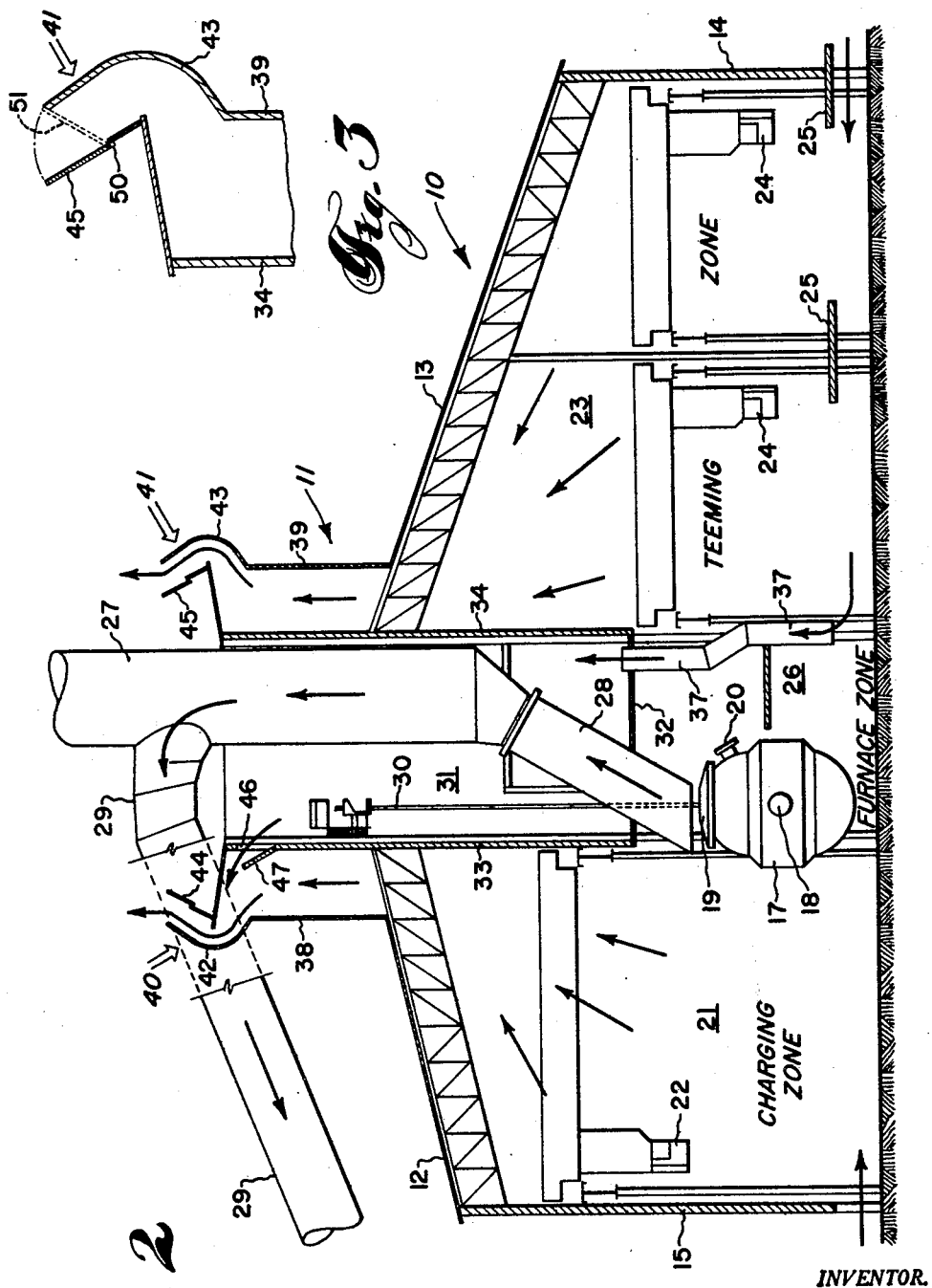

3,058,412
BUILDING FOR OXYGEN STEEL MAKING
Carl F. Jueng, Pittsburgh, Pa., assignor to
H. H. Robertson Company
Filed July 15, 1960, Ser. No. 43,017
3 Claims. (Cl. 98—42)

The present invention relates to buildings for oxygen steel-making process equipment and more particularly to apparatus for ventilating the same.

The steel industry recently has developed a basic oxygen steel-making process which produces high quality steel in minutes rather than hours. When this process is employed, a heat of steel can be refined in about one hour or less time. The basic oxygen steel-making process is carried out in a trunnion mounted furnace having a top opening for charging and a tap hole near the top opening. Hot metal and steel scrap is charged into the furnace through the top opening while the furnace is in a tilted position. The furnace is restored to a vertical position and lime and flux are deposited into the charge. Thereafter a water cooled lance is lowered into the top opening of the furnace and high purity oxygen is blown downwardly through the lance into the furnace for oxidizing the impurities in the charge. At the termination of the purification, the lance is withdrawn from the top opening and the furnace is tilted to pour the finished heat of steel through the tap hole into ingots.

According to the present invention I provide a method and apparatus for ventilating buildings in which oxygen steel-making equipment is installed. Specifically I have found that such buildings present four separate ventilating requirements and propose that each of the four separate ventilating requirements be provided with independent ventilating means, all of which are correlated and arranged so as to provide a pleasing, balanced appearance in the resulting building.

For a complete understanding of the present invention, its objects and advantages, references should be had to the following detailed description and the accompanying drawings in which:

FIGURE 2 is a cross-sectional view taken through the typical building of FIGURE 1 illustrating in greater detail the arrangement and correlation of ventilating means according to this invention; and FIGURE 3 is a fragmentary cross-sectional view of the right-hand ventilator shown in FIGURE 2 illustrating typical damper movement.

Figure 1:
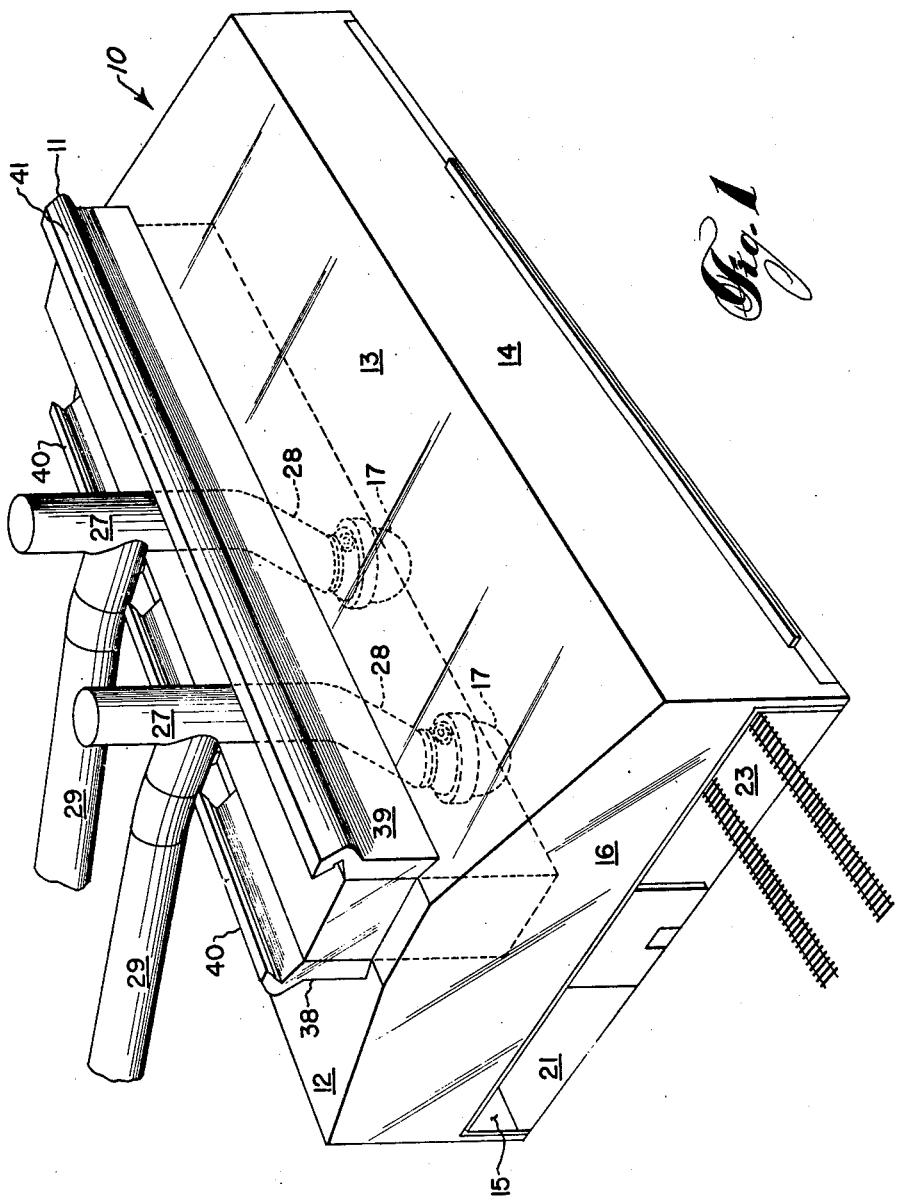
FIGURE 1 is a perspective illustration, partly in phantom, showing a building according to the present invention for housing basic oxygen steel-making process equipment.

Referring to the drawings there is illustrated a building 10 having an elevated central portion 11 and pitched roofs 12, 13. The building 10 has side walls 14, 15 and end walls 16.

Within the building 10 one or more oxygen furnaces 17 are mounted for tilting movement on trunnions 18. The furnace 17 has an open top 19 and a tap hole 20. Within the building 10, to the left of the furnace 17, is a charging zone 21 (beneath the pitched roof 12) in which one or more overhead cranes 22 are provided to carry hot metal and scrap steel for charging into the furnace 17. During the charging operation, the furnace 17 is tilted counterclockwise (FIGURE 2) so that the open top 19 is oriented in the charging zone 21. During the purification cycle the furnace 17 is in the vertical position as shown in FIGURE 2.

To the right-hand side of the furnace 17 is a teeming zone 23 (beneath the pitched roof 13) in which one or more overhead cranes 24 are provided to receive purified steel which is discharged from the furnace 17 through the tap hole 20 into hot metal ladles (not shown) from which the purified steel is poured into ingots on pouring platforms 25.

The central portion of the building where the furnaces 17 are mounted, between the charging zone 21 and the teeming zone 23, is identified as the furnace zone 26.

A vertical stack 27 having a sloping bottom portion 28 is mounted in the center portion 11 of the building 10 to vent the hot gases, vapors, fumes and dust which are discharged under natural draft from the furnace 17 through the top opening 19 during the purification cycle. It will be observed that a take-off duct 29 communicates with the vertical stack 27 to permit cleaning of the discharged hot gases, vapors, fumes and dust in suitable recovery equipment (not shown). Under normal operation, the top of the vertical stack 27 will be closed. Only in emergency situations will the top of the vertical stack 27 be opened to allow the hot gases, vapors, fumes and dust to be discharged into the atmosphere.

The reason for the sloping duct 28 at the lower portion of the vertical stack 27 is to provide access into the furnace 17 through the top opening 19 for water cooled oxygen lances 30 which are vertically slidably mounted in the central portion 11 of the building 10 above the furnace 17.

During the steel making cycle, the operating personnel of the steel making plant are required to move about through the central portion 11 of the building 10 above the furnace 17 to observe the operations, to add lime and fluxing materials when needed, to operate the water cooled oxygen lances 30, to recover steel and slag samples for analysis, and for other expeditious reasons. In order to protect the operating personnel from thermal exposure within the building 10, I provide a substantially totally enclosed personnel zone 31 having a bottom wall 32 and side walls 33, 34. A suitable opening is provided in the bottom wall 32 to receive the water cooled oxygen lances 30. The sloping duct 28 also extends upwardly through the bottom wall 32. A ventilating duct 37 extends upwardly into the personnel zone 31 for admitting fresh air from a relatively dust-free source within the building 10 or from an external air intake point. The walls 32, 33, 34 are substantially impervious to the passage of gases.

A longitudinal ventilator shaft 38 is provided above the pitched roof 12 with the side wall 33 forming one of the walls thereof. A further ventilator shaft 39 is provided above the pitched roof 13 with one of the side walls 34 forming a wall thereof. Longitudinal monitor ventilators 40, 41 are mounted above each of the ventilator shafts 38, 39 respectively. The ventilators 40, 41 have lateral cowling 42, 43 and horizontally hinged damper blades 44, 45. Ventilators of this type are described generally in U.S. Patent 2,009,870 issued to George E. Black and assigned to the assignee of the present invention. It will be observed that the continuous monitor ventilator 40 above the pitched roof 12 is broken into segments to provide clearance for the ducts 29.

The ventilator 41 is illustrated in FIGURE 3 to show typical damper movement. The damper blade 45 is pivoted about a shaft 50 so that it can be positioned in a fully opened position as indicated by the numeral 45 or in a fully closed position as indicated in phantom outline by the numeral 51.

It will be further observed that the charging zone 21, the furnace zone 26 and the teeming zone 23 are intercommunicating.

From inspection of FIGURE 2 it will be apparent that the hot gases and dust from the charging zone 21 are discharged upwardly by natural draft through the stack 38 and outwardly through the ventilator 40. The hot gases and dust from the teeming zone 23 are discharged upwardly by natural draft through the stack 39 and the ventilator 41. The hot gases, vapors, fumes and dust from the furnace zone 26 are discharged upwardly through the stack 27 and the duct 29. The ventilating gases from the personnel zone 31 are discharged through an opening 46 in the side wall 33 into the stack 38. An adjustable damper 47 may be provided to regulate the opening 46.

The maximum heat dissipation load in an oxygen steel-making process results from the furnace itself. In the present building, that heat load is separately dissipated through the stack 27 and is independent of the remaining structure.

The next greatest heat dissipation load results in the teeming zone 23 where molten steel at high temperatures releases thermal energy. The heat dissipation load from the teeming zone 23 is separately dissipated through the stack 39 and the longitudinal ventilator 41.

The remaining heat dissipation load results in the charging zone 21 where hot metal releases some thermal energy while it is being prepared for charging into the furnaces 17. The heat dissipation load from the charging zone 21 is separately dissipated through the stack 38 and the longitudinal ventilator 40. It will be observed that the provision of pitched roofs 12, 13 above the charging zone 21 and teeming zone 23 respectively permits the utilization of natural draft ventilators for the dissipation of heat loads.

The final zone of the oxygen steel-making process requiring particular ventilating requirements is the personnel zone 31 which is independently provided with fresh air for the operating personnel and has a separate air removal opening 46 for elimination of air from the personnel zone 31 by natural draft which may be accompanied by aspirating action of the hot gases passing upwardly through the stack 38.

The present building permits design of each ventilator 40, 41 according to the calculable requirements of the heat dissipation zones which are served independently thereby.

According to the provisions of the patent statutes, I have explained the principle, preferred embodiment and mode of operation of my invention and have illustrated and described what I now consider to represent its best embodiment. However, I desire to have it understood that, within the scope of the appended claims, the invention may be practiced otherwise than as specifically illustrated and described.

I claim:

1. A building for housing oxygen steel-making process equipment including a high temperature furnace, charging and teeming apparatus, said building having a central portion in the middle area of the said building near the floor level extending the length of the building and having a first lateral portion near the floor level between the said central portion and a first side of the said building and having a second lateral portion near the floor level between said central portion and a second side of the said building, the said lateral portions and the said central portion being in open communication at the said floor level, a furnace zone within the said central portion, a horizontal wall extending across said central portion above the said furnace zone, the said high temperature furnace being located within the said furnace zone, said building having a pitched roof above each of the said lateral portions sloping from the said side upwardly toward the said central portion to an upper level above the said horizontal wall, vertical walls extending upwardly from the said horizontal wall above the said upper level and serving to separate the said central portion from the said lateral portions in the region above the said horizontal wall, a roof extending between the upper ends of said vertical walls above the said upper level, said roof, said horizontal wall and said vertical walls defining an enclosed personnel zone, said charging apparatus being located within said first lateral portion, said teeming apparatus being located within said second lateral portion, stack means within said central portion extending upwardly through said horizontal wall, through said enclosed personnel zone and through said roof, said stack means communicating with said furnace zone, first ventilator means located at the said upper level of said pitched roof above said first lateral portion outboard from said vertical walls for discharging gases from said first lateral portion, second ventilator means located at the said upper level of said pitched roof above said second lateral portion outboard from said vertical walls for discharging gases from said second lateral portion, fresh air inlet means extending into said enclosed personnel zone, air discharge means comprising an opening in one of said vertical walls extending from said enclosed personnel zone into one of said first and second ventilator means.

2. The building of claim 1 wherein hot gases from said furnace, said charging zone and said teeming zone are discharged from the interior of said building under natural draft.

3. The building of claim 1 wherein said first and second ventilator means include pivotally movable damper blades.

References Cited in the file of this patent

UNITED STATES PATENTS

| 1,287,572 | Dalton | Dec. 10, 1918 |
| 2,009,870 | Black | July 30, 1935 |